(No Model.)
J. N. KAILOR.
RUBBER FOR CLOVER HULLERS.
No. 310,523. Patented Jan. 6, 1885.
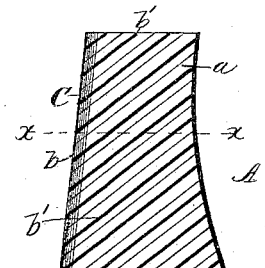
Fig. 1.
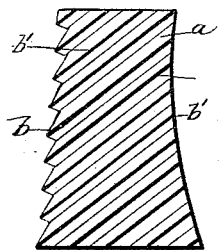
Fig. 2.
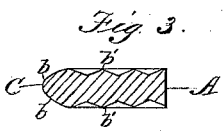
Fig. 3.
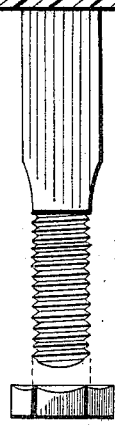
Attest:
W. S. Bernhard
J. P. Reeside
Inventor:
John N Kailor
By his Attorneys
N. PETERS. Photo-Lithographer, Washington, D. C.

UNITED STATES PATENT OFFICE.

JOHN N. KAILOR, OF NEWARK, ASSIGNOR TO THE NEWARK MACHINE COMPANY, OF COLUMBUS, OHIO.

RUBBER FOR CLOVER-HULLERS.

SPECIFICATION forming part of Letters Patent No. 310,523, dated January 6, 1885.

Application filed August 27, 1884. (No model.)

*To all whom it may concern:*

Be it known that I, JOHN N. KAILOR, a citizen of the United States, residing at Newark, in the county of Licking and State of Ohio, have invented certain new and useful Improvements in Rubbers for Clover-Hullers, of which the following is a specification, reference being had therein to the accompanying drawings.

My invention relates to rubbers for clover-hullers; and the novelty consists in the construction and adaptation of the same, as will be more fully hereinafter set forth, and pointed out in the claims.

The invention is designed as an improvement upon the device patented March 6, 1877, No. 188,064, the title to which and to the present invention resides in the same party. In that device the sides were arranged at an angle to each other, the front edge was smooth, and the corrugations ran upward or outward from the direction of travel.

In the present invention the rubber is preferably made with substantially parallel fluted sides, with an inclined corrugated sharp front, and with the corrugations running obliquely downward and forward.

The device is adapted for service particularly upon the upper cylinder of a clover-huller substantially as shown in the patent referred to herein, and in all respects, except the parallel sides, corrugated and sharpened front edge, and the direction of the corrugations, may be similar to the rubber therein set forth. The inclined front may be formed with a sharp vertical prow, to which the grooves and ridges extend, as set forth in another application filed by me of even date herewith, Serial No. 141,567; or the corrugations may be made continuous around the sharpened front, as set forth in my application, Serial No. 141,568.

I consider it important that the inclined front edge shall present alternate projections and depressions, and that the sides be parallel, and the corrugations run obliquely downward and forward to induce the material away from the cylinder.

The invention is illustrated in the accompanying drawings, in which Figure 1 is a side elevation of one form of front. Fig. 2 is a similar view of another form of front, and Fig. 3 is a horizontal section through the line $x\ x$ of Fig. 1.

Referring to the drawings, A designates the body of the rubber having a sharpened inclined front, $b$, and having parallel fluted sides $a$. The corrugations $b'$ extend to the front center of the rubber, and form a junction with a prow, C, as seen in Fig. 1, or extend around the sharpened front, as shown in Fig. 2. The corrugations extend forward and obliquely downward, and tend to induce the material away from the cylinder.

I have shown and described the rubber as preferably having parallel sides; but I do not wish to be understood as limiting myself to rubbers in which the sides are geometrically parallel, or substantially so, since my improved construction can be employed on rubbers the sides of which are not parallel.

I do not confine myself to the precise form of rubber shown; but

What I claim as new is—

1. The rubber described, having fluted sides and a sharpened inclined corrugated front, the direction of the corrugations extending forward and obliquely downward, as set forth.

2. The rubber described, having parallel fluted sides and a sharpened inclined corrugated front, the direction of the corrugations extending forward and obliquely downward, as set forth.

In testimony whereof I affix my signature in presence of two witnesses.

JOHN N. KAILOR.

Witnesses:
A. N. APPLEMAN,
O. J. THOMAS.